US006608156B1

(12) United States Patent
Martinez et al.

(10) Patent No.: US 6,608,156 B1
(45) Date of Patent: *Aug. 19, 2003

(54) PROCESS FOR PREPARING INTERPOLYMERS OF ETHYLENE AND 2,3-DIHYDROFURAN, OR A HETEROATOM SUBSTITUTED OLEFIN MONOMER AND ETHYLENE INTERPOLYMERS

(75) Inventors: Jose Pedro Martinez, Longview, TX (US); Jeffrey James Vanderbilt, Longview, TX (US)

(73) Assignee: Eastman Chemical Company, Kingsport, TN (US)

(*) Notice: Subject to any disclaimer, the term of this patent is extended or adjusted under 35 U.S.C. 154(b) by 142 days.

This patent is subject to a terminal disclaimer.

(21) Appl. No.: 09/679,999

(22) Filed: Oct. 5, 2000

(51) Int. Cl.[7] .............................................. C08F 128/06
(52) U.S. Cl. ...................... 526/256; 526/242; 526/257; 526/258; 526/266; 526/269; 526/270; 526/275; 526/279; 526/314
(58) Field of Search ................. 526/269, 266, 526/270, 314, 256, 257, 242, 258, 275, 279

(56) References Cited

U.S. PATENT DOCUMENTS

| 2,511,942 A | 6/1950 | Prichard |
| 2,570,601 A | 10/1951 | Schmerling |
| 4,897,498 A | 1/1990 | Monnier et al. |
| 4,904,744 A | 2/1990 | Gerget et al. |
| 4,970,294 A | 11/1990 | Drent et al. |
| 5,082,956 A | 1/1992 | Monnier et al. |
| 5,250,743 A | 10/1993 | Boaz |
| 5,315,019 A | 5/1994 | Phillips et al. |
| 5,393,867 A | 2/1995 | Matayabas, Jr. et al. |
| 5,406,007 A | 4/1995 | Falling |
| 5,434,314 A | 7/1995 | Matayabas, Jr. et al. |
| 5,466,759 A | 11/1995 | Matayabas, Jr. et al. |
| 5,466,832 A | 11/1995 | Tustin |
| 5,502,137 A | 3/1996 | Matayabas, Jr. et al. |
| 5,536,851 A | 7/1996 | Monnier |
| 5,536,882 A | 7/1996 | Matayabas, Jr. et al. |
| 5,591,874 A | 1/1997 | Puckette et al. |
| 5,608,034 A | 3/1997 | Falling et al. |
| 6,090,900 A | 7/2000 | Turner et al. |

OTHER PUBLICATIONS

Bissinger, W.E., et al., *J. Am. Chem. Soc.*, 1947, pp. 2955–2961, vol. 69.
Rempp, P., et al., *Polymer Synthesis*, 1991, pp. 144–163, Hüthig & Wepf, 2nd Edition, Basel.
Drent, E., et al., *J. Organomet.Chem.* 1991, pp. 235–251, vol. 417.
Sen, A., et al., *J.Am. Chem. Soc.*, 1982, pp. 3520–3522, vol. 104.
Lai, T.W., et al., *Organometallics*, 1984, pp. 866–870, vol. 3.
Brookhart, M., et al., *J. Am. Chem. Soc.*, 1992, pp. 5894–5895, vol. 114.
Brookhart, M., et al., *J. Am. Chem. Soc.*, 1994, pp. 3641–3642, vol. 116.
Nozaki, K., et al., *J. Am. Chem. Soc.*, 1995, pp. 9911–9912, vol. 117.

*Primary Examiner*—Bernard Lipman
(74) *Attorney, Agent, or Firm*—Charles R. Richard; Bernard J. Graves, Jr.

(57) ABSTRACT

There is described a novel process for preparing interpolymers comprising ethylene, at least one monomer unit selected from heteroatom substituted olefin monomer units derived from a compound of the formula XV

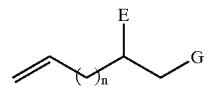

XV wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20; or 2,3-dihydrofuran, and optionally carbon monoxide, and interpolymers prepared thereby, including novel interpolymers having melting peak temperatures ($T_m$) equal to or greater than 50° C.

16 Claims, No Drawings

PROCESS FOR PREPARING INTERPOLYMERS OF ETHYLENE AND 2,3-DIHYDROFURAN, OR A HETEROATOM SUBSTITUTED OLEFIN MONOMER AND ETHYLENE INTERPOLYMERS

FIELD OF THE INVENTION

This invention relates to a process for preparing interpolymers of ethylene, at least one or more heteroatom substituted olefin monomers, and optionally carbon monoxide. The process is a high pressure, free radical initiator, polymerization process. The invention also relates to novel ethylene interpolymers having $T_m$ values of at least 50° C.

BACKGROUND OF THE INVENTION

Plastics and elastomers derived from olefins are used in numerous diverse applications, from trash bags to fibers for clothing. Olefin polymers are used, for instance, in injection or compression molding applications, such as extruded films of sheeting, as extrusion coatings on paper, such as photographic paper and thermal and digital recording paper, and the like. Constant improvements in catalysts have made it possible to better control polymerization processes, and thus influence the properties of the bulk material. Increasingly, efforts are being made to tune the physical properties of plastics for lightness, strength, resistance to corrosion, permeability, optical properties, and the like, for particular uses. In addition to chain length and branching, the incorporation of monomers containing functional groups, such as ethers and esters, offers an opportunity to further modify and control the properties of the bulk material. For example, the early transition metal catalyst systems (i.e., Group IV) tend to be intolerant to such functional groups, which often causes catalyst deactivation.

Conventional low density polyethylenes are readily prepared in high temperature, high pressure polymerizations using peroxide initiators. These high pressure free radical systems can also be used to prepare ethylene copolymers containing functional vinyl monomers, but it is important to note that only a small number of monomers can be polymerized in this high energy (e.g., 20° C., 30K psi) process, i,e., vinyl acetate and methyl acrylate.

Certain transition metal catalysts, such as those based on titanium compounds (e.g., $TiCl_3$ or $TiCl_4$) in combination with organoaluminum cocatalysts, are used to make high density polyethylene and linear low density polyethylenes (HDPE and LLDPE, respectively), as well as poly-$\alpha$-olefins such as polypropylene. These so-called "Ziegler-Natta" catalysts are quite sensitive to oxygen, sulfur and Bronsted acids, and thus generally cannot be used to make olefin copolymers with functional vinyl monomers having oxygen, sulfur, or Bronsted acids as functional groups.

Zielger-Natta and metallocene catalyst systems, however, have the drawback that they cannot generally be used in olefin polymerization reactions with functionalized monomers. It is known in the art that homogeneous single site transition metal catalysts generally allow for specific control of catalyst activity through variation of the electronic and steric nature of the ligand. Homogeneous catalysts are known to offer several advantages over heterogeneous catalysts, such as decreased mass transport limitations, improved heat removal, and narrower molecular weight distributions.

None of the references described above disclose the copolymerization of olefins with 3,4-epoxy-1-butene (hereinafter "epoxybutene"), epoxybutene derivatives, and analogs thereof. Epoxybutene is a readily available compound containing two reactive groups: a double bond and an epoxide. By reaction at one or both groups, epoxybutene can easily be converted into a host of compounds.

The preparation of epoxybutene and derivatives thereof, and examples of the same, have previously been described in numerous references, including, but not limited to, U.S. Pat. Nos. 4,897,498; 5,082,956; 5,250,743; 5,315,019; 5,406,007; 5,466,832; 5,536,851; and 5,591,874 which are incorporated herein by reference. Reaction at one or both of these sites affords a host of olefinic derivatives, many of which contain versatile functional groups. Polymerization of epoxybutene has been performed using traditional thermal and free radical initiated reactions, however the pendant epoxide group often does not survive the reaction conditions.

Advances in the polymerization of epoxybutene and its derivatives include the following:

L. Schmerling et al., U.S. Pat. No. 2,570,601 describes the thermal homopolymerization of epoxybutene and the thermal copolymerization of epoxybutene and various vinyl monomers, such as vinyl chloride, vinyl acetate, acrylonitrile, butadiene and styrene.

Polymerization reactions of epoxybutene, in which the epoxide ring is opened to afford polyethers, are known, such as those described in: S. N. Falling et al., U.S. Pat. No. 5,608,034 (1997); J. C. Matayabas, Jr., S. N. Falling, U.S. Pat. No. 5,536,882 (1996); J. C. Matayabas, Jr. et al., U.S. Pat. No. 5,502,137 (1996); J. C. Matayabas, Jr., U.S. Pat. No. 5,434,314 (1995); J. C. Matayabas, Jr., U.S. Pat. No. 5,466,759 (1995); and J. C. Matayabas, Jr., U.S. Pat. No. 5,393,867 (1995).

W. E. Bissinger et al., *J. Am. Chem. Soc.*, 1947, 69, 2955 describes the benzoyl peroxide initiated free radical polymerization of vinyl ethylene carbonate, a derivative of epoxybutene.

Cationic polymerization of vinyl ethers (such as 2,3-dihydrofuran) is known using Lewis acids or proton-containing acids as initiators. These monomers have been shown to polymerize violently through a cationic polymerization mechanism—often at rates orders of magnitude faster than anionic, or free radical polymerizations—in the presence of both Bronsted and Lewis acids (P. Rempp and E. W. Merrill, "Polymer Synthesis," Huthig & Wepf, $2^{nd}$ ed, Basel (1991), pp.144–152). Olefin addition polymerization of vinyl ethers via a transition metal mediated insertion mechanism has not been demonstrated.

In addition, the synthesis of alternating copolymers and terpolymers of olefins and carbon monoxide is of high technical and commercial interest. New polymer compositions, as well as new processes to make polymers derived from olefins and carbon monoxide, are constantly being sought. Perfectly alternating copolymers of $\alpha$-olefins and carbon monoxide can be produced using bidentate phosphine ligated Pd(II) catalyst systems (Drent et al., *J. Organomet. Chem.*, 1991, 417, 235). These semi-crystalline copolymers are used in a wide variety of applications including fiber and molded part applications. These materials are high performance polymers having high barrier and strength, as well as good thermal and chemical stability.

Alternating copolymerization of olefins and CO using Pd(II) catalysts has been demonstrated by Sen et al., *J. Am. Chem. Soc.*, 1982, 104, 3520; and *Organometallics*, 1984, 3, 866, which described the use of monodentate phosphines in combination with $Pd(NCMe)_4 (BF_4)_2$ for the in situ generation of active catalysts for olefin/CO copolymerization.

However, these catalyst systems suffer from poor activities and produce low molecular weight polymers. Subsequent to Sen's early work, Drent and coworkers at Shell described the highly efficient alternating copolymerization of olefins and carbon monoxide using bisphosphine chelated Pd(II) catalysts. Representative patents and publications include:

U.S. Pat. No. 4,904,744 (1990); *J. Organomet. Chem.*, 1991, 417, 235; and

U.S. Pat. No. 4,970,294 (1990).

Recent advances in olefin/CO copolymerization catalysis include the following:

Brookhart et al., *J. Am. Chem. Soc.*, 1992, 114, 5894, described the alternating copolymerization of olefins and carbon monoxide with Pd(II) cations ligated with 2,2-bipyridine and 1,10-phenanthroline;

Brookhart et al., *J. Am. Chem. Soc.*, 1994, 116, 3641, described the preparation of a highly isotactic styrene/CO alternating copolymer using $C_2$-symmetric Pd(II) bisoxazoline catalysts;

Nozaki et al, *J. Am. Chem. Soc.*, 1995, 117, 9911 described the enantioselective alternating copolymerization of propylene and carbon monoxide using a chiral phosphine-phosphite Pd(II) complex.

None of these references teach the copolymerization of olefins with carbon monoxide and functionalized olefins, like epoxybutene and related compounds.

U.S. Pat. No. 6,090,900 discloses homopolymers of olefin monomers having polar functional groups, and copolymers of these monomers with each other and with non-polar olefins, and optionally carbon monoxide.

SUMMARY OF THE INVENTION

The present invention is directed to interpolymers comprising ethylene, at least one, or more, monomer units selected from heteroatom substituted olefin monomer units derived from a compound of the formula XV.

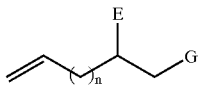

XV wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20;

or 2,3-dihydrofuran, and optionally carbon monoxide. The novel products of the present invention are the interpolymers as described herein that are characterized by having a melting peak temperature ($T_m$), as determined by the procedure specified herein, of equal to or greater than 50° C., preferably from equal to or greater than 50° C. to about 115° C.

The novel process for preparing the interpolymers comprising ethylene, the at least one or more monomer unit selected from the specified heteroatom substituted olefin monomer unit or 2,3-dihydrofuran, and, optionally, carbon monoxide, including the novel interpolymers of the present invention characterized by having a melting peak temperature ($T_m$) of equal to or greater than 50° C., preferably from equal to or greater than 50° C. to about 115° C., is comprised as follows. The interpolymers are produced by polymerization of the monomers in any suitable high pressure reactor known for the polymerization of ethylene-containing monomer mixtures, examples of which include autoclaves, tubular reactors and the like. In general, the interpolymerization of the monomers is conducted at a temperature of from about 150° C. to about 350° C., at a pressure of from about 68 to about 304 MPa's (about 671 to about 3000 atmospheres), and for a period of time of from about 2 to about 600 seconds. The interpolymerization process is conducted in the presence of at least one, or more, free radical initiators, that are defined as chemical substances that, under the polymerization conditions utilized, initiate chemical reactions by producing free radicals.

DETAILED DESCRIPTION OF THE INVENTION

The present invention is directed to interpolymers comprising ethylene, at least one, or more, monomer units selected from heteroatom substituted olefin monomer units derived from a compound of the formula XV

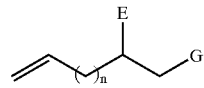

XV wherein E and G represent the same or different, heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20;

or 2,3-dihydrofuran, and optionally carbon monoxide. The novel products of the present invention are the interpolymers as described herein that are characterized by having a melting peak temperature ($T_m$), as determined by the procedure specified herein, of equal to or greater than 50° C., preferably from equal to or greater than 50° C. to about 115° C.

The novel process for preparing the interpolymers comprising ethylene, the at least one or more monomer unit selected from the specified heteroatom substituted olefin monomer unit or 2,3-dihydrofuran, and, optionally, carbon monoxide, including the novel interpolymers of the present invention characterized by having a melting peak temperature ($T_m$) of equal to or greater than 50° C., preferably from equal to or greater than 50° C. to about 115° C., is comprised as follows. The interpolymers are produced by polymerization of the monomers in any suitable high pressure reactor known for the polymerization of ethylene-containing monomer mixtures, examples of which include autoclaves, tubular reactors and the like. In general, the interpolymerization of the monomers is conducted at a temperature of from about 150° C. to about 350° C., at a pressure of from about 68 to about 304 MPa's (about 671 to about 3000 atmospheres), and for a period of time of from about 2 to about 600 seconds. The interpolymerization process is conducted in the presence of at least one, or more, free radical initiators, that are defined as chemical substances that, under the polymerization conditions utilized, initiate chemical reactions by producing free radicals.

In more detail, the interpolymers comprise from about 0.1 to about 99.9 mol percent (%), preferably about 40 to about 99.9, more preferably about 90 to about 99.9 mol %, ethylene; from about 0.1 to about 99.9 mol percent (%), preferably about 0.1 to about 60, more preferably about 0.1 to about 10 mol %, of the at least one or more monomer units selected from heteroatom substituted olefin monomer units derived from a compound of the formula XV

XV

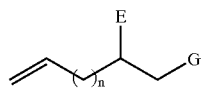

wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20; or 2,3-dihydrofuran; and from about 0 to about 10 mol percent (%) carbon monoxide, all of the amounts based on the total interpolymer.

Exemplary heteroatom substituted olefin monomer units derived from a compound of the formula XV

XV

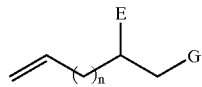

include the following:

II

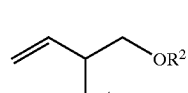

V

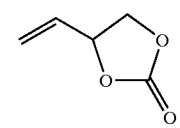

VI

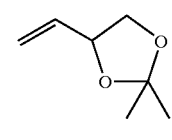

VII

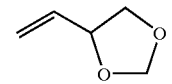

VIII

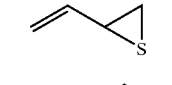

IX

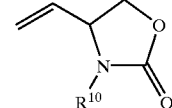

X

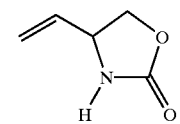

XI

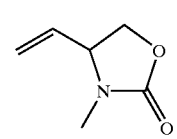

XII

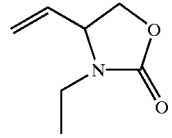

XIII

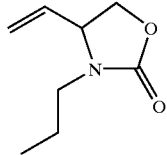

XIV

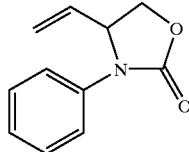

XVI

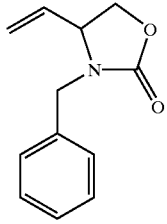

XVII

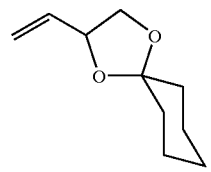

XVIII

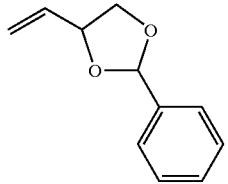

XIX

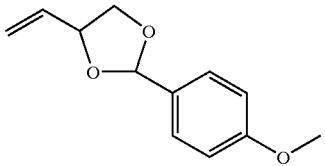

XX

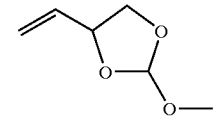

XXI

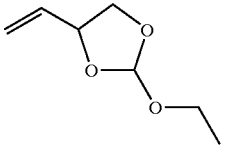

-continued
XXII 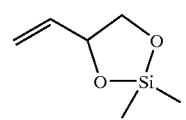
XXIII 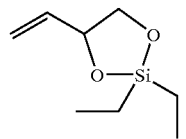
XXIV 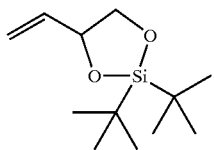
XXV 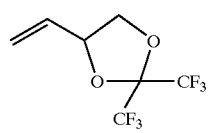
XXVI 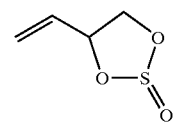
XXVII 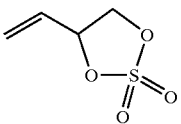
XXVIII 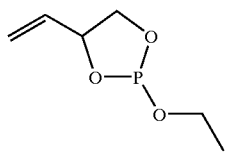
XXIX 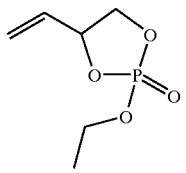
XXX 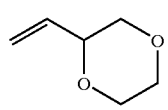
XXXI 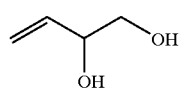
XXXII 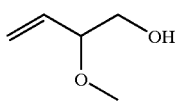
-continued
XXXIII 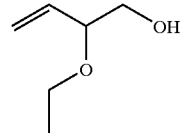
XXXIV 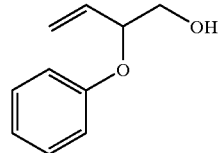
XXXV 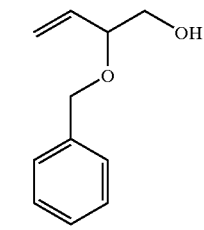
XXXVI
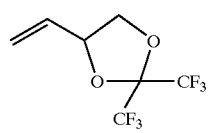
XXXVII
XXXVIII
XXXIX
XL
XLI
XLII 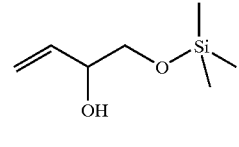
XLIII 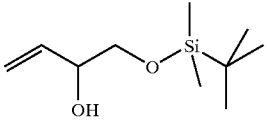

-continued
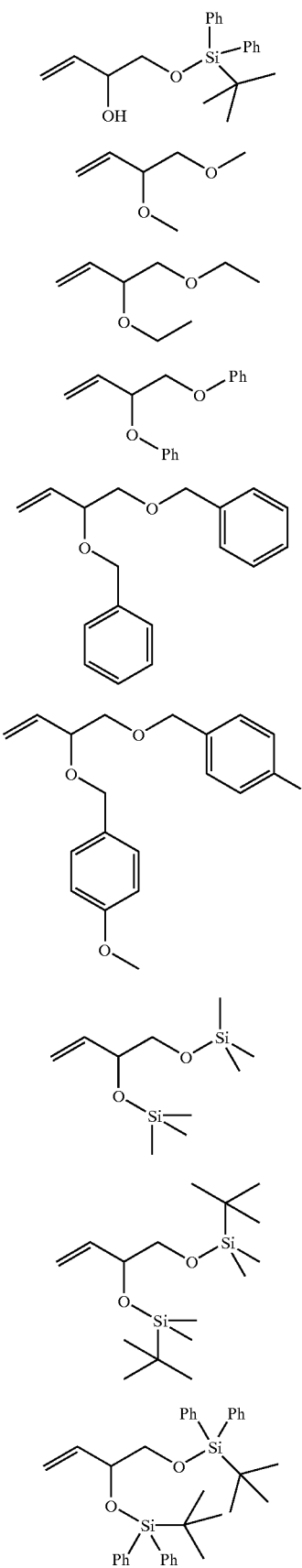
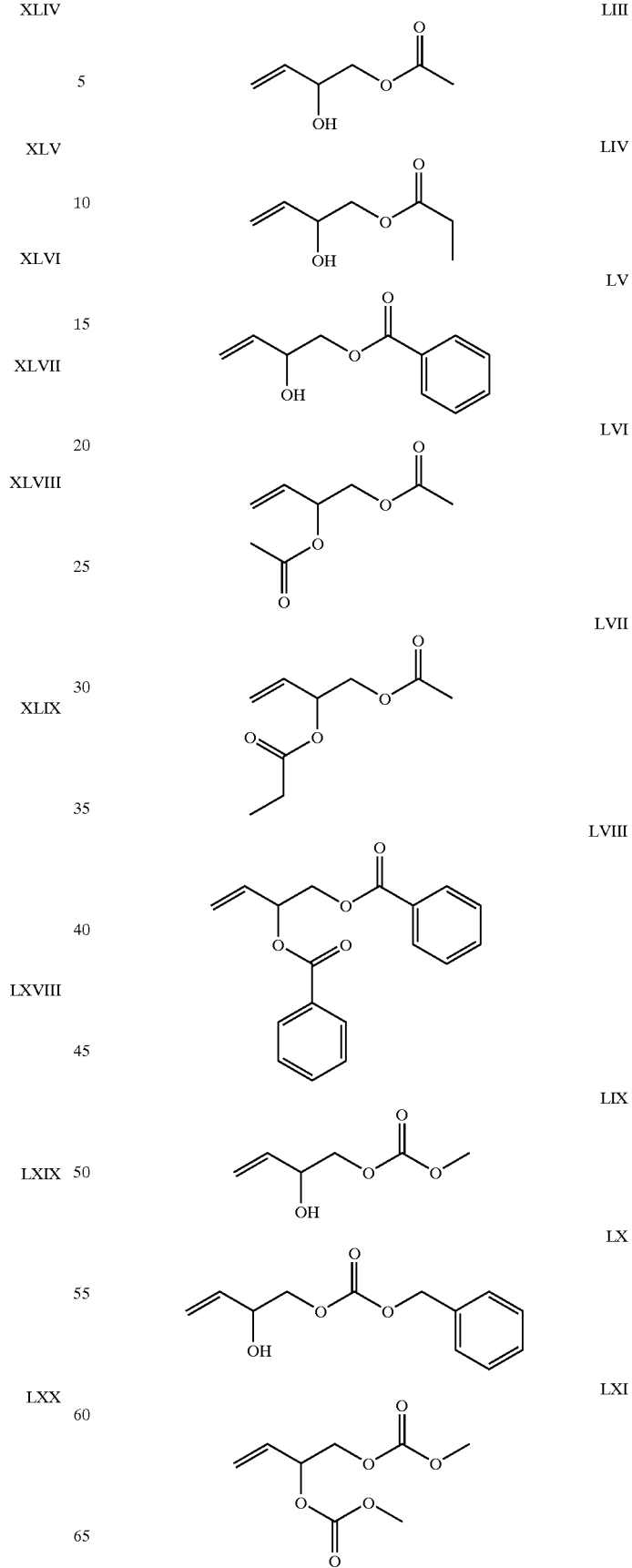

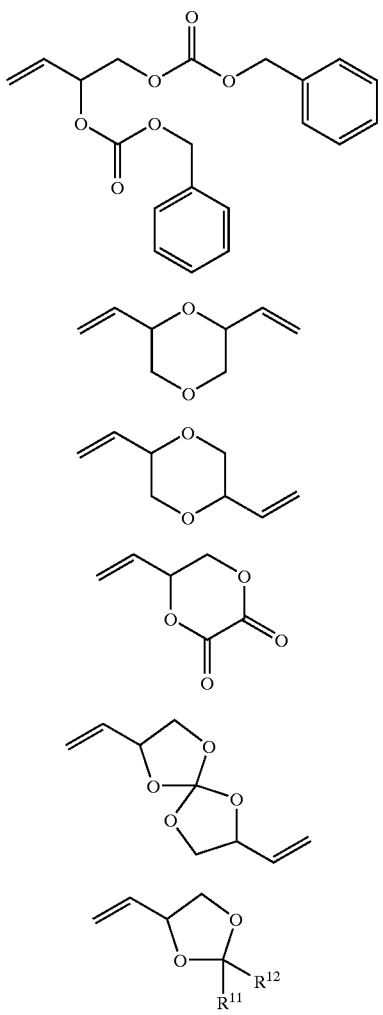

wherein $R^1$ and $R^2$ are independently hydrogen, hydrocarbyl, substituted hydrocarbyl, heteroatom connected hydrocarbyl, or $R^1$ and $R^2$ collectively from a bridging group Y wherein Y is hydrocarbyl, substituted hydrocarbyl, heteroatom connected hydrocarbyl, or heteroatom connected substituted hydrocarbyl; $R^{10}$, $R^{11}$, and $R^{12}$ are independently hydrogen, hydrocarbyl, or substituted hydrocarbyl; and Ph is phenyl. Particularly preferred interpolymers of the present invention include ethylene and either vinylethylene carbonate, 2,3-dihydrofuran, 3,4-diacetoxy-1-butene, and 3-butene-1,2-diol, optionally with carbon monoxide.

The novel process for preparing the ethylene interpolymers described herein is further characterized as follows. The interpolymerization process is conducted at a pressure of from about 68 to about 304 MPa's (about 671 to about 3000 atmospheres), preferably from about 103 to about 241 MPa's (about 1020 to about 2381 atmospheres), and more preferably from about 138 to about 207 MPa's (about 1361 to about 2041 atmospheres). The interpolymerization process is conducted at a temperature of from about 150° C. to about 350° C., preferably from about 150° C. to about 250° C., and more preferably from about 150° C. to about 200° C. The interpolymerization process is conducted for a period of time ranging from about 2 to about 600 seconds, preferably from about 30 to 300 seconds, and more preferably from about 30 to about 60 seconds.

The interpolymerization process is conducted in the presence of at least one, or more, free radical initiators. As used herein, a free radical initiator is defined as a chemical substance that, under the polymerization conditions utilized, initiates chemical reactions by producing free radicals. Exemplary free radical initiators, suitable for use in the present process, include the following listed substances.

1. Organic Peroxides such as:
   a. t-alkyl peroxyesters such as
      tert-butyl peroxybenzoate,
      tert-butyl peroxyacetate,
      tert-butyl peroxypivalate,
      tert-butyl peroxymaleate, and the like;
   b. monoperoxycarbonates such as
      OO-tert-butyl O-isopropyl monoperoxycarbonate, and the like;
   c. diperoxyketals such as
      ethyl 3,3-di-(tert-amylperoxy)-butyrate,
      n-butyl4,4-di(tertbutylperoxy)-valerate,
      1,1-di(tert-butylperoxy)-cyclohexane,
      1,1-di(tert-amylperoxy)-cyclohexane, and the like;
   d. dialkyl peroxides such as
      2,5-di (tert-butyl peroxy)-2,5 dimethyl-3-hexyne,
      2,5-di(tert-butylperoxy)-2,5-dimethylhexane,
      di-tert-amyl peroxide,
      di-tert-butyl peroxide,
      dicumyl peroxide, and the like;
   e. t-alkyl hydroperoxides such as
      tert-butyl hydroperoxide,
      tert-amyl hydroperoxide,
      α-cumyl hydroperoxide, and the like;
   f. ketone peroxides such as
      methyl ethyl ketone peroxide,
      cyclohexanone peroxide,
      2,4-pentanedione peroxide, and the like;
   g. Isobutyryl peroxide,
      Isopropyl peroxydicarbonate,
      Di-n-butyl peroxydicarbonate,
      Di-sec-butyl peroxydicarbonate,
      Tert-butyl perneodecanoate,
      Dioctanoyl peroxide,
      Didecanoyl peroxide,
      Diproprionyl peroxide,
      Didecanoyl peroxide,
      Dipropionyl peroxide,
      Dilauroyl peroxide,
      tert-butyl perisobutyrate,
      tert-butyl peracetate,
      tert-butyl per-3,5,5-trimethyl hexanoate, and the like.
2. Inorganic Peroxides such as
   Hydrogen peroxide-ferrous sulfate,
   Hydrogen peroxide-dodecyl mercaptan,
   Potassium peroxydisulfate, and the like;
3. Azo Compounds such as
   2,2'-azobis[4-methoxy-2,4-dimethyl]pentanenitrile,
   2,3'-azobis[2,4-dimethyl]pentanenitrile,
   2,2'-azobis[isobutyronitrile], and the like;
4. Carbon-Carbon Initiators such as
   2,3-dimethyl-2,3-diphenylbutane,
   3,4-dimethyl-3,4-diphenylhexane,
   1,1,2,2-tetraphenyl-1,2bis(trimethylsiloxy)ethane, and the like;
5. Photoinitiators such as
   Benzophenone, 4-phenylbenzophenone,
xanthone,
Thioxanthone,
2-chlorothioxanthone,
4,4'-bis(N,N'-dimethylamino benzophenone (Michler's ketone),
benzil,
9,10-phenanthraquinone,
9,10-anthraquinone,
α,α-dimethyl-α-hydroxyacetophenone,
(1-hydroxycyclohexyl)-phenylmethanone,
benzoin ethers
  methyl
  ethyl
  isobutyl,
α,α-dimethoxy-α-phenylacetophenone
1-phenyl-1,2-propanedione,2-(O-benzoyl)oxime,
diphenyl(2,4,6-trimethylbenzoyl)phosphineoxide,
α-timethylamino-α-ethyl-α-benzyl-3,5-dimethyl4-morpholinoacetophenone, and the like;
6. Radiation, such as
  x-rays
  γ-rays.
  α-particles
  β-particles The free radical initiators are generally utilized in amounts of from about 1 to about 1000 ppm (parts per million), preferably from about 20 to about 300 ppm, and more preferably from about 50 to about 100 ppm, based on the total weight of the ethylene component of the interpolymer.

Mixtures of free radical initiators can be used. The free radical initiators can be introduced into the polymerization process in any manner known in the art.

The polymerization process according to the present invention is conducted in a continuous or batch process manner. Any continuous or batch type process can be used in the practice of the present invention.

The interpolymers of the present invention are useful for one or more of the following: printable film; "breathable" film; adhesive formulations; glass-fiber reinforcement; polymer blends; compatibilizing agents; toughening agent for nylon and similar materials; grafting applications; conducting polymers; plastic plating; ionomers; thermosetting applications; coatings; powder coatings—flame sprayed polyethylene; engineering plastics—impact resistant masses; tie-layers—as the carbonate or diacetate copolymers or as their hydrolyzed versions, the diols; urethanes; epoxies—through the conversion of the carbonate rings into epoxide functionalities; cross-linking agents; molding applications; paper and textile additives; low temperature applications; vulcanization; wax applications; clay filled materials for sound barrier applications; blend components to lower heat seal initiation temperature; oxygen scavenging applications; as polydiols, for polyester or polycarbonate synthesis; may be used with typical additives such as pigments, colorants, titanium dioxide, carbon black, antioxidants, stabilizers, slip agents, flame retarding agents, and the like.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way. Moreover, all U.S. patents referred to herein are incorporated by reference in their entirety.

EXAMPLES

In the following examples, the test procedures listed below were used in evaluating the analytical properties of the interpolymers.

(a) Molecular Weight Distribution Based on GPC (Mw/Mn)

The Weight Average (Mw) and the Number Average (Mn) molecular weights were determined using a Waters Gel Permeation Chromatography Series 150C/ALC/GPC at 138° C. The method for determining Mw and Mn is that recommended by Millipore Corporation, Milford, Mass., in the operators manual 082916TP Revision 0, October 1993. The Gel Permeation Chromatography unit (GPC) was equipped with ultra styrogel columns and a refractive index detector. The instrument automatically calculates the Mw (Weight Average Molecular Weight) and Mn (Number-Average Molecular Weight) using standard TriSEC GPC software version 2.70 as sold with the machine. The machine was calibrated with NBS 1475 polyethylene acquired from the U.S. Department of Commerce National Institute of Standards and Technology in Gathersburg, Md. 20899. The solvent used was ortho-dichlorobenzene. The polyethylene was dissolved in the orth-dichlorobenzene such that a solution containing 0.1 percent polyethylene was formed. The solution was run through the GPC at 1.0 milliliter/minute. Mw and Mn are reported as grams/mol.

(b) DSC Procedure

Melting Peak Temperature ($T_m$) was determined in accordance with ASTM D 3418-97 using a Differential Scanning Calorimeter (DSC). The $T_m$ values listed in the table are not true equilibrium melting points but are DSC peak temperatures of the melt transition recorded on the second heat cycle. In each case, approximately 10 mg of polymer sample was placed in an aluminum sample pan and the sample lid was crimped in place. The sample was then heated to 150° C. at a rate of 60° C./minute and held at 150° C. for 5 minutes. The sample was then cooled to 0° C. at a rate of 10° C./minute while recording the freezing or crystallization curve. After holding for 5 minutes at 0° C., the second heat cycle was initiated and the sample was heated at a rate of 10° C./minute to a final temperature of 150° C. while recording the heating curve. The melting peak temperature, $T_m$, was obtained from the melt transition on the heating curve of the second heat cycle. $T_m$ values are reported as degrees C.

(c) Tg Determination

Tg was determined in accordance with ASTM D3418-82. Tg was measured at the half height between the base lines drawn from the glassy state and the rubbery state. The parameters used in this work are the following: Onset and Step Transition Limits are set on "Automatic" mode; Step Transition Midpoint at "Half Height;" Step Signal Change between "Onset and End." Tg values are reported as degrees C.

In carrying out Examples 1–8, 13–15, 23, 24, 26 and 27, a batch reactor process was utilized. The process involved the use of a reactor set-up consisting of the following. A 30 mL (milliliter) stainless steel sample tube number 1 (1800 psi rating) was loaded with 30 mL of heptane and purged with nitrogen gas for 15 minutes. A second 30 mL sample tube number 2 (1800 psi rating) was loaded with the designated monomer(s) other than ethylene, peroxide, and an amount of heptane sufficient to bring the total volume of tube number 2 to 30 mL. Upon equilibration of the autoclave batch reactor (300 mL, Autoclave Engineers, AE Magnedrive II, Model Number: BC0030SS05AH) to the desired temperature, the contents of sample tube number 1 were loaded into the reactor followed by the contents of tube number 2 using ethylene at 306 atm (31 MPa). The polymerization was allowed to continue for 2–6 hours. Upon cooling to room temperature and venting the reactor, the resultant interpolymer was transferred into an Erlenmeyer flask utilizing acetone as solvent for rinsing the interpolymer mixture out of the reactor. The mixture was stirred at 400–500 rpm to disperse the interpolymer. 500 mL of methanol was added to the dispersed interpolymer and the mixture was filtered to isolate the interpolymer. The interpolymer was air dried and subjected to a vacuum of 1 mm mercury at 45° C. overnight to yield a white powder.

In carrying out Examples 9–12, 16–22, and 25, a continuous reactor process was utilized. The process involved the use of a high pressure stirred autoclave reactor having a 15 mL capacity. The reactor was supplied with ethylene at 1800 atm. (182.4 MPa) from high-pressure compressors, with comonomer(s) other than ethylene, and initiator. The comonomer delivery system consisted of a metal casing that housed a balance and a tared, open, metal container with a metal siphoning tube protruding into the liquid. The metal casing was pressurized to 4.9 atm. (0.5 MPa) by a membrane pump to provide a suction pressure for efficient comonomer delivery into the reactor. A digital signal from the comonomer delivery balance directly to the main control center for the reactor allowed delivery of specified amounts of comonomer into the reactor. Each polymerization reaction was allowed to proceed according to the conditions in Table 1. To avoid air oxidation of exiting hot interpolymer, a nitrogen gas purging system was installed for each collecting, aluminum bin prior to and after collection of sample. To aid in the rapid cooling of the exiting sample, each collecting bin was partially filled with isododecane. Due to the use of isododecane and incomplete incorporation of comonomer, a work-up was required to isolate pure material. The work-up procedure consisted of grinding interpolymer that had been cooled with liquid nitrogen, and subjecting the resulting powder to 1 mm mercury vacuum at 45° C. until a constant weight was achieved. The polymerization process consisted of the following: Equilibration of temperature of the reactor to a value 30–40 degree below the desired working temperature. Equilibration of ethylene pressure was achieved by using two high performance compressors to achieve the approximate required value of 1800 atm. (182.4 MPa). The two compressors were provided with a required ethylene suction pressure of 300 atm. (30 MPa) by a smaller compressor. Upon equilibration of ethylene pressure under the required temperature, initiator was delivered into the reactor at one fourth the concentration, and the concentration was steadily increased to the desired concentration. This slow increase in initiator concentration was done in an effort to avoid unexpected "run-away," or decomposition reactions. The comonomer was introduced at the rate and reaction conditions specified in Table 1. As the polymerization is an exothermic process, the temperature generally rose to the desired value during the reaction. Mild external heating was provided if this did not occur. The homopolymerization of ethylene was allowed to proceed for 15–30 min. The comonomer was then injected neat or as a solution (30:70 vol/vol) in hexane. Copolymerization was then allowed to proceed for 30–40 min before collection of interpolymer.

The process of the present invention and interpolymers resulting therefrom are further described in the following Tables 1 and 2. Table 1 includes processing conditions utilized in preparing interpolymers of Examples 1–27. Table 2 includes the properties of the interpolymers of Examples 1–27.

TABLE 1

Preparation of Interpolymers of Ethylene with VEC[4], DAcB[5], 2,3-DHF[6], or Bu-diol[17] Comonomers

| Ex. No.[1] | Comon[2] (Concentration)[3] | Ethylene[7] | Pressure Atm/MPa[8] | Rxn Temp (° C.)[9] | Init[10] | Init Conc[15] (ppm) | Rxn Time[16] |
|---|---|---|---|---|---|---|---|
| 1 | VEC/3.5 g | 0.081 g | 31/3.14 | 100 | 1[(11)] | 92,286 | 4 hr |
| 2 | VEC/15 g | 0.085 g | 68/6.89 | 200 | 1 | 21,533 | 5 hr |
| 3 | VEC/15 g | 0.086 g | 102/10.3 | 120 | 1 | 11,400 | 6.5 hr |
| 4 | VEC/5.0 g | 1.42 g | 170/17.2 | 80 | 1 | 44,000 | 4 hr |
| 5 | VEC/5.0 g | 1.78 g | 204/20.7 | 90 | 1 | 44,000 | 5 hr |
| 6 | VEC/4.4 g | 1.78 g | 204/20.7 | 100 | 1 | 50,228 | 3 hr |
| 7 | VEC/5.0 g | 1.78 g | 204/20.7 | 110 | 1 | 44,000 | 6.5 hr |
| 8 | VEC/10.0 g | 2.38 g | 306/31.0 | 150 | 2[(12)] | 26,000 | 5 hr |
| 9 | VEC/1 g/hr | 400 g/hr | 1800/182.4 | 200 | 3[(13)] | 100 | 60 sec |
| 10 | VEC/3 g/hr | 400 g/hr | 1800/182.4 | 200 | 3 | 100 | 60 sec |
| 11 | VEC/2.6 g/hr | 400 g/hr | 1800/182.4 | 240 | 2 | 100 | 60 sec |
| 12 | VEC/1.2 g/hr | 400 g/hr | 1800/182.4 | 240 | 2 | 100 | 60 sec |
| 13 | DAcB/2 g | 2.38 g | 306/31.0 | 150 | 2 | 26,000 | 7 hr |
| 14 | DAcB/4 g | 2.38 g | 306/31.0 | 200 | 4[(14)] | 9,000 | 5 hr |
| 15 | DAcB/1 g | 2.38 g | 306/31.0 | 120 | 2 | 26,000 | 7.7 hr |
| 16 | DAcB/5 g/hr | 400 g/hr | 1800/182.4 | 210 | 3 | 100 | 60 sec |
| 17 | DAcB/2 g/hr | 400 g/hr | 1800/182.4 | 200 | 3 | 50 | 30 sec |
| 18 | DAcB/15 g/hr | 400 g/hr | 1800/182.4 | 230 | 3 | 100 | 60 sec |
| 19 | DAcB/20 g/hr | 400 g/hr | 1800/182.4 | 230 | 3 | 100 | 60 sec |
| 20 | DAcB/30 g/hr | 400 g/hr | 1800/182.4 | 230 | 3 | 100 | 60 sec |
| 21 | DAcB/3 g/hr | 400 g/hr | 1500/152.0 | 230 | 3 | 100 | 60 sec |
| 22 | DAcB/3 g/hr | 400 g/hr | 1200/121.6 | 230 | 3 | 100 | 60 sec |
| 23 | 2,3-DHF/10 g | 2.38 g | 306/31.0 | 160 | 4 | 18,000 | 4.5 hr |

TABLE 1-continued

Preparation of Interpolymers of Ethylene with VEC[4], DAcB[5], 2,3-DHF[6], or Bu-diol[17] Comonomers

| Ex. No.[1] | Comon[2] (Concentration)[3] | Ethylene[7] | Pressure Atm/MPa[8] | Rxn Temp (° C.)[9] | Init[10] | Init Conc[15] (ppm) | Rxn Time[16] |
|---|---|---|---|---|---|---|---|
| 24 | 2,3-DHF/10 g | 2.38 g | 306/31.0 | 150 | 2 | 26,000 | 4.5 hr |
| 25 | 2,3-DHF/5.4 g/hr | 400 g/hr | 1800/182.4 | 220 | 2 | 100 | 60 sec |
| 26 | Bu-Diol/1.94 | 2.38 g | 306/31.0 | 150 | 2 | 26,000 | 4.5 hr |
| 27 | Bu-Diol/3.88 | 2.38 g | 306/31.0 | 150 | 2 | 26,000 | 3.5 hr |

[1]Ex No = Example Number;
[2]Comon = comonomer;
[3]Grams of Comonomer for batch reactor or feed rate in g/hr for continuous reactor;
[4]VEC = vinylethylene carbonate;
[5]DAcB = 3,4-diacetoxy-1-butene;
[6]2,3-DHF = 2,3-dihydrofuran;
[7]Grams of ethylene in batch reactor or feed rate into continuous reactor;
[8]Ethylene Pressure · Atm = atmospheres, MPa = mega pascals, (1 MPa = $1/10^6$ pascals);
[9]Rxn Temp = Reaction Temperature in ° C.;
[10]Init = initiator;
[11]1 = tert-amyl peroxy-2-ethylhexanoate;
[12]2 = tert-butyl peroxy-2-ethylhexyl carbonate;
[13]3 = tert-butyl-per-2-ethylhexanoate;
[14]4 = tert-butylhydroperoxide;
[15]Init Conc = Initiator concentration, ppm = parts per million;
[16]Rxn Time = Reaction Time; >60 sec is batch reactor; 60 sec or less is continuous reactor;
[17]Bu-diol = 3-butene-1,2-diol.

TABLE 2

Properties of Interpolymers of Ethylene with VEC[4], DAcB[5], 2,3-DHF[6], or Bu-Diol[7] Comonomers

| Example | Comon[1]/ mol %[2] | Tm (° C.) | Tg (° C.) | Mn (g/mol) | Mw (g/mol) | Mw/ Mn |
|---|---|---|---|---|---|---|
| 1 | VEC/35 | ND[3] | 37 | 2,779 | 4,639 | 1.67 |
| 2 | VEC/26 | ND | 110 | 3,953 | 5,906 | 1.49 |
| 3 | VEC/50 | ND | 124 | 6,810 | 11,564 | 1.7 |
| 4 | VEC/2.5 | 110 | | 9,919 | 54,152 | 54.6 |
| 5 | VEC/36 | 105.7 | | 5,898 | 11,714 | 2 |
| 6 | VEC/29 | 100 | | 6,422 | 10,647 | 1.66 |
| 7 | VEC/47 | 103 | | 6,217 | 11,532 | 11.5 |
| 8 | VEC/7 | 89 | | 4,454 | 6,801 | 1.53 |
| 9 | VEC/1.1 | 105 | | 4,454 | 6,801 | 1.53 |
| 10 | VEC/6 | 80 | | 5,480 | 27,300 | 4.98 |
| 11 | VEC/4.3 | 81 | | 2,700 | 6,760 | 3.29 |
| 12 | VEC/1.7 | 94 | | 5,290 | 17,400 | 3.29 |
| 13 | DAcB/2 | 92.3 | | 2,650 | 6,050 | 2.28 |
| 14 | DAcB/4 | 78 | | 1,300 | 2,240 | 1.72 |
| 15 | DAcB/1 | 101.1 | | 4,240 | 8,490 | 2 |
| 16 | DAcB/1.3 | 88 | | 7,380 | 35,100 | 4.76 |
| 17 | DAcB/0.3 | 104 | | 15,400 | 80,900 | 5.25 |
| 18 | DAcB/9 | ND | -37 | 1,830 | 4,050 | 2.21 |
| 19 | DAcB/12 | ND | -32 | 1,620 | 3,290 | 2.04 |
| 20 | DAcB/14 | ND | ND | 1,150 | 1,960 | 1.7 |
| 21 | DAcB/1.1 | 93 | | 4,800 | 27,300 | 5.69 |
| 22 | DAcB/3 | 66 | | 2,940 | 6,060 | 2.03 |
| 23 | 2,3-DHF/1 | 96.2 | | 1,740 | 2,900 | 1.67 |
| 24 | 2,3-DHF/1 | 103.3 | | 1,450 | 2,260 | 1.56 |
| 25 | 2,3-DHF/1 | 109.7 | | 3,920 | 10,500 | 2.68 |
| 26 | Bu-Diol/0.2 | 107.3 | | 1,480 | 3,080 | 1.67 |
| 27 | Bu-Diol/0.5 | 105.3 | | 2,640 | 1,630 | 1.62 |

[1]Comon = comonomer;
[2]mol % of comonomer - the remainder of the copolymer is ethylene;
[3]ND = non-determinable, sample is amorphous;
[4]VEC = vinylethylene carbonate;
[5]DAcB = 3,4-diacetoxy-1-butene;
[6]2,3-DHF = 2,3-dihydrofuran;
[7]Bu-Diol = 3-butene-1,2-diol.

It should be clearly understood that the forms of the invention herein described are illustrative only and are not intended to limit the scope of the invention; The present invention includes all modifications falling within the scope of the following claims.

We claim:

1. An interpolymer comprising from about 0.1 to about 99.9 mol percent of ethylene, from 0 to about 10 mol percent of carbon monoxide, and from about 0.1 to about 99.9 mol percent of at least one, or more, monomer units selected from the group consisting of 2,3-dihydrofuran and a heteroatom substituted olefin monomer unit derived from a compound of the formula XV

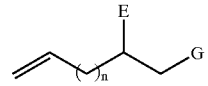

XV wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20, and said interpolymer having a melting peak temperature ($T_m$) equal to or greater than 50° C.

2. The interpolymer according to claim 1 wherein the interpolymer comprises from about 40 to about 99.9 mol percent of ethylene.

3. The interpolymer according to claim 1 wherein the interpolymer comprises from about 0.1 to about 60 mol percent of at least one, or more, monomer units selected from the group consisting of 2,3-dihydrofuran and a heteroatom substituted olefin monomer unit derived from a compound of formula XV

XV

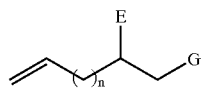

wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20.

4. The interpolymer according to claim 1 wherein the interpolymer comprises 2,3-dihydrofuran.

5. The interpolymer according to claim 1 wherein the interpolymer comprises a heteroatom substituted olefin monomer unit derived from a compound of the formula XV

XV

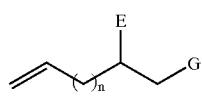

wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20, selected from II
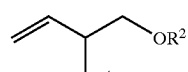

V
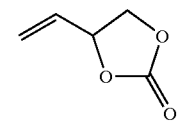

VI
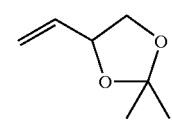

VII
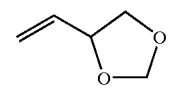

VIII
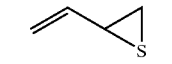

IX
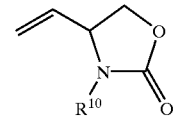

X
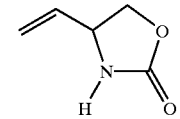

XI
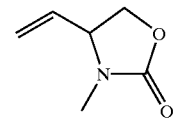

XII
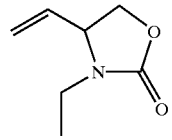

XIII
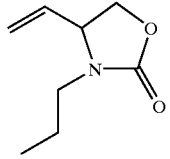

XIV
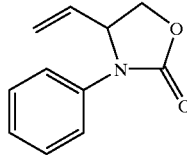

XVI
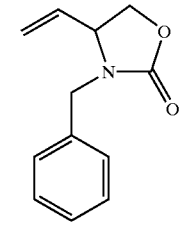

XVII
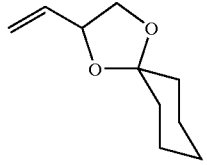

XVIII
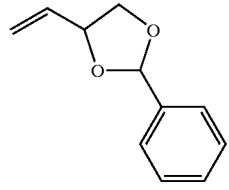

XIX
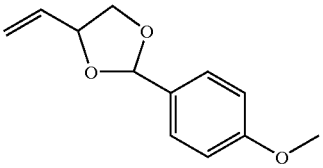

XX
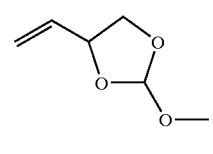

XXI
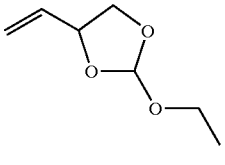

-continued
XXII 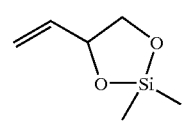
XXIII 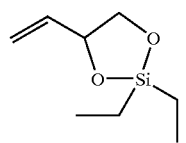
XXIV 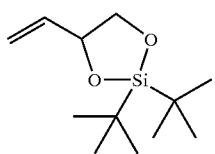
XXV 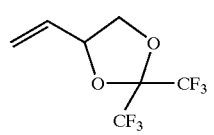
XXVI 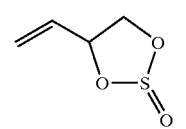
XXVII 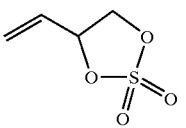
XXVIII 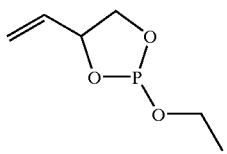
XXIX 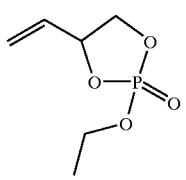
XXX 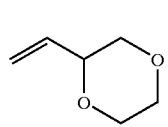
XXXI 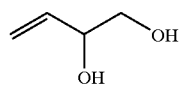
XXXII 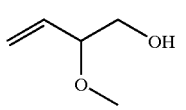
-continued
XXXIII 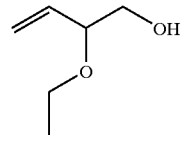
XXXIV 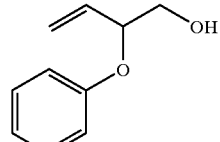
XXXV 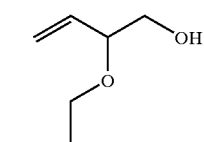
XXXVI 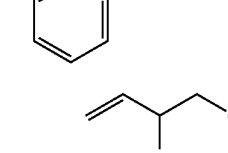
XXXVII 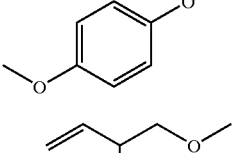
XXXVIII 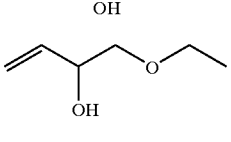
XXXIX 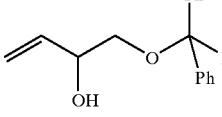
XL 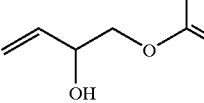
XLI 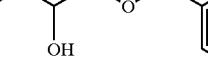
XLII 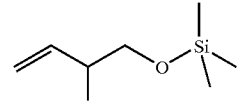
XLIII 

-continued
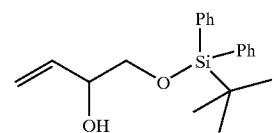
XLIV
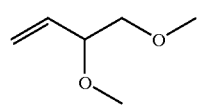
XLV
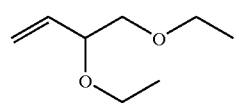
XLVI
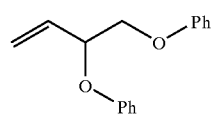
XLVII
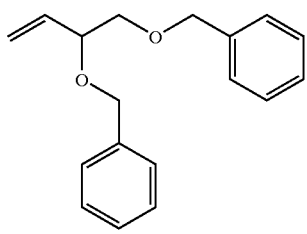
XLVIII
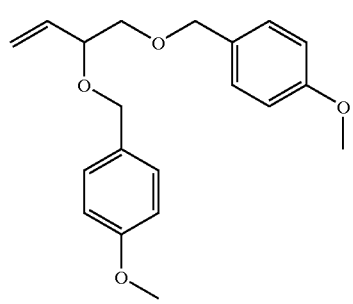
XLIX
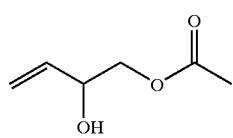
LIII
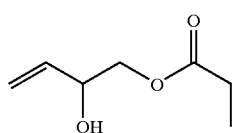
LIV
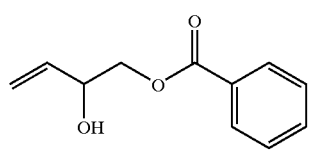
LV
-continued
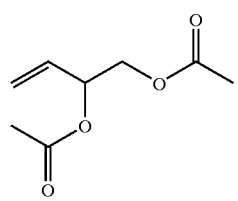
LVI
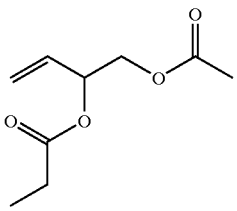
LVII
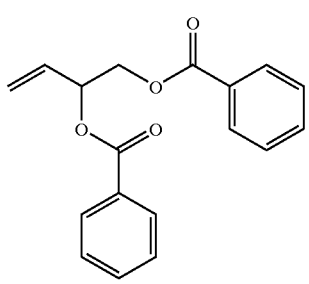
LVIII
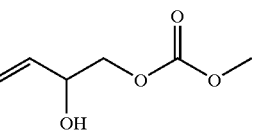
LIX
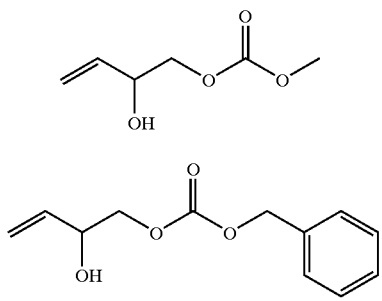
LX
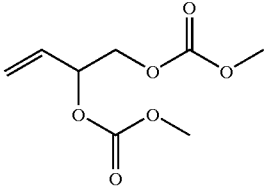
LXI
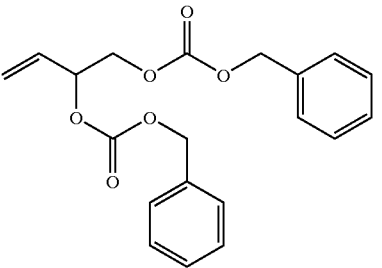
LXII
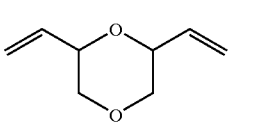
LXIII -continued LXIV
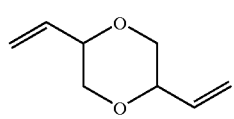

LXV
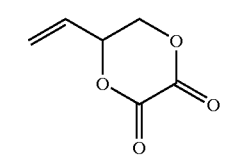

LXVI
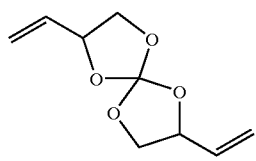

LXVII
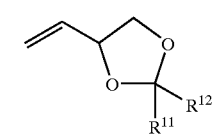

LXVIII
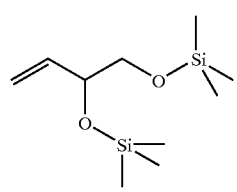

LXIX
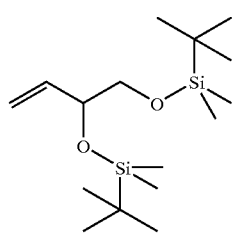

LXX
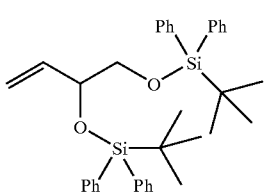

wherein $R^1$ and $R^2$ are independently hydrogen, hydrocarbyl, substituted hydrocarbyl, heteroatom connected hydrocarbyl, or $R^1$ and $R^2$ collectively from a bridging group Y, wherein Y is hydrocarbyl, substituted hydrocarbyl, heteroatom connected hydrocarbyl, heteroatom connected substituted hydrocarbyl; $R^{10}$, $R^{11}$, and $R^{12}$ are independently hydrogen, hydrocarbyl, or substituted hydrocarbyl; and Ph is phenyl.

6. The interpolymer according to claim 5 wherein the heteroatom substituted olefin monomer unit is selected from vinylethylene carbonate, 3,4diacetoxy-1-butene, and 3-butene-1,2-diol.

7. The interpolymer according to claim 1 wherein the melting peak temperature ($T_m$) ranges from equal to or greater than 50° C. to about 115° C.

8. The interpolymer according to claim 1 wherein the interpolymer comprises from 0.1 to about 99.9 mol percent of ethylene, from 0.1 to about 99.9 mol percent of vinylethylene carbonate, and zero percent of carbon monoxide.

9. The interpolymer according to claim 1 wherein the interpolymer comprises from 0.1 to about 99.9mol percent of ethylene, from 0.1 to about 99.9 mol percent of 3,4-diacetoxy-1-butene, and zero percent of carbon monoxide.

10. A process for preparing an interpolymer comprising polymerizing from about 0.1 to about 99.9 mol percent of ethylene, from 0 to about 10 mol percent of carbon monoxide, and from about 0.1 to about 99.9 mol percent of at least one, or more, monomer units selected from the group consisting of 2,3-dihydrofuran and a heteroatom substituted olefin monomer unit derived from a compound of the formula XV XV
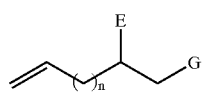

wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20, at a temperature of from about 150° C. to about 350° C., at a pressure of from about 68 MPa's to about 304 MPa's, and for a period of from about 2 to about 600 seconds, in the presence of at least one, or more free radical initiator wherein the interpolymer has a melting peak temperature ($T_m$) equal to or greater than 50° C.

11. The process according to claim 10 wherein the monomer unit is 2,3-dihydrofuran.

12. The process according to claim 10 wherein the monomer unit is a heteroatom substituted olefin monomer unit derived from a compound of the formula XV XV
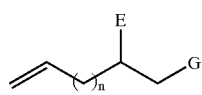

wherein E and G represent the same or different heteroatoms selected from oxygen, nitrogen, and sulfur, which are bound to a hydrogen atom, a hydrocarbyl group, or a substituted hydrocarbyl group, or are joined by a linking group; and n is 0 or an integer from 1–20, selected from II
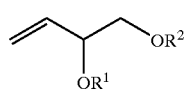

V
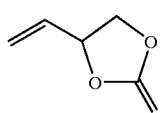

VI
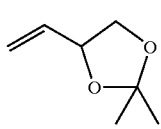

VII
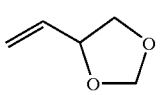

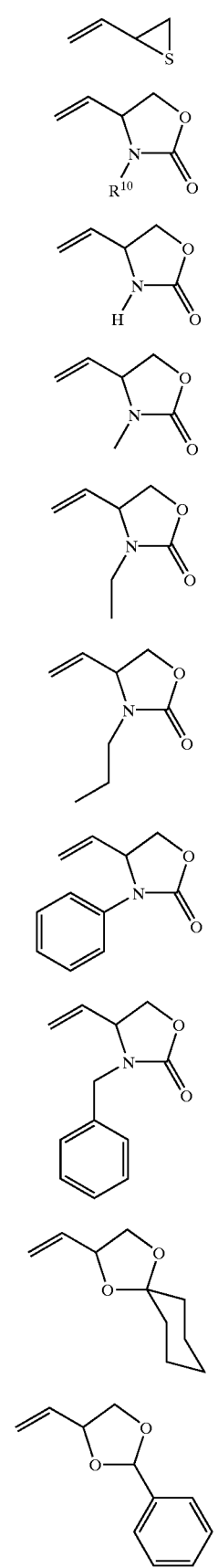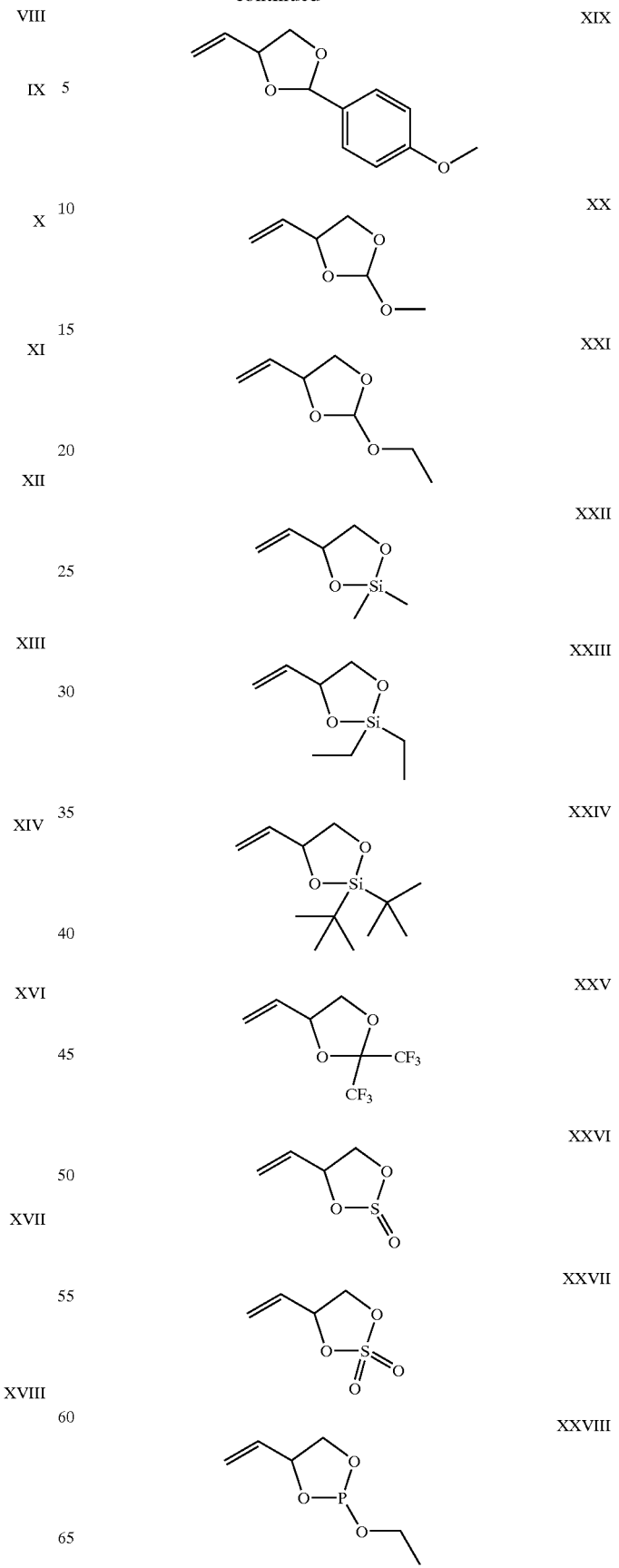

-continued
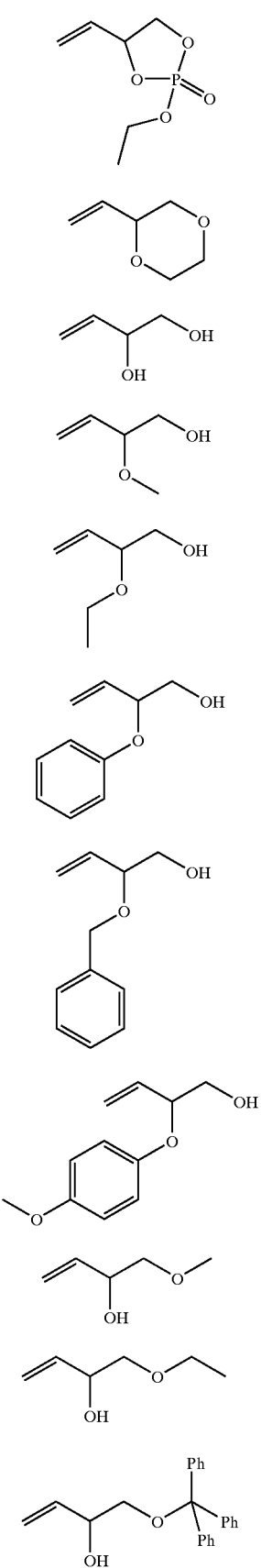
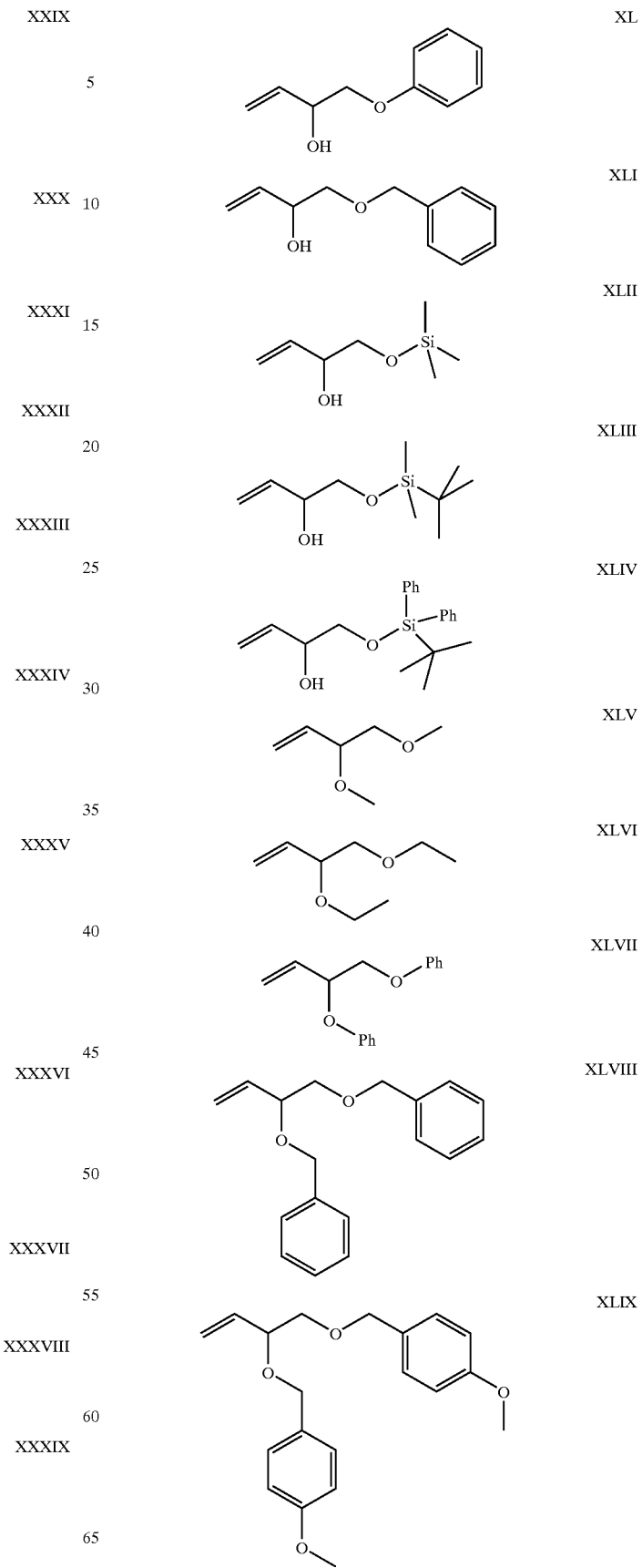

-continued
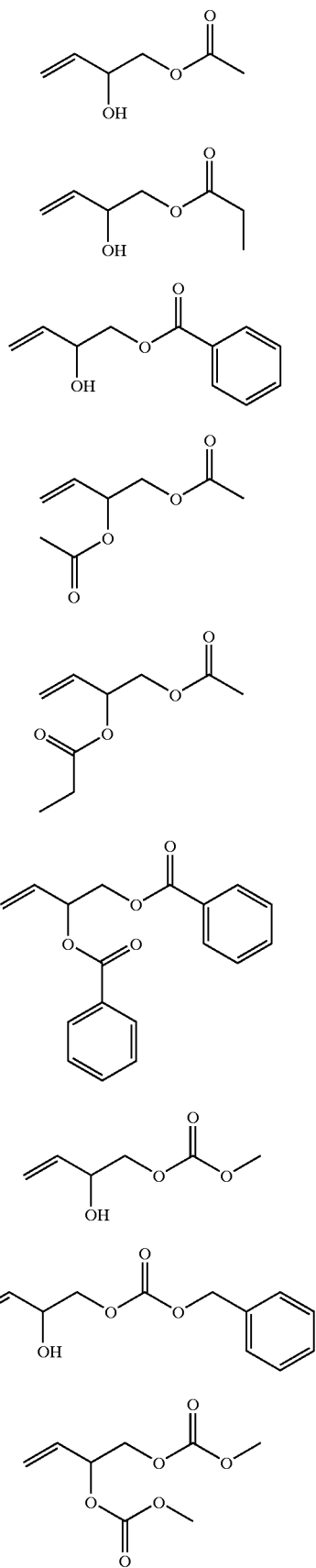
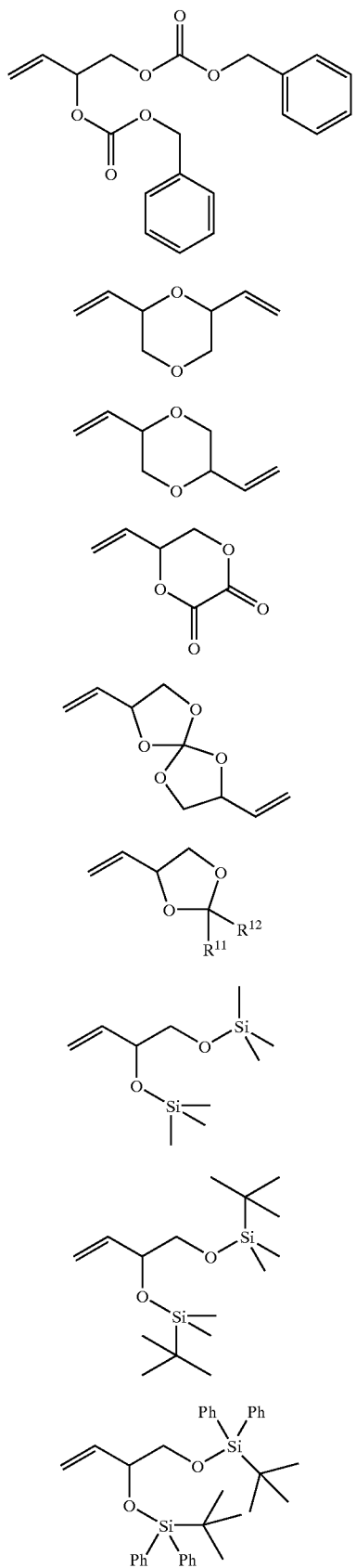

wherein $R^1$ and $R^2$ are independently hydrogen, hydrocarbyl, substituted hydrocarbyl, heteroatom connected hydrocarbyl, or $R^1$ and $R^2$ collectively form a bridging group Y, wherein Y is hydrocarbyl, substituted hydrocarbyl, heteroatom connected hydrocarbyl, or heteroatom connected substituted hydrocarbyl; $R^{10}$, $R^{11}$, and $R^{12}$ are independently hydrogen, hydrocarbyl, or substituted hydrocarbyl; and Ph is phenyl.

13. The process according to claim 12 wherein the heteroatom substituted olefin monomer unit is selected from vinylethylene carbonate, 3,4-diacetoxy-1-butene, and 3-butene-1,2-diol.

14. The process according to claim 10 wherein the free radical initiator is selected from organic peroxides and inorganic peroxides.

15. The process according to claim 14 wherein the free radical initiator is an organic peroxide selected from tert-amyl peroxy-2-ethylhexanoate, tert-butyl peroxy-2-ethylhexyl carbonate, tert-butyl-per-2-ethylhexanoate, and tert-butylhydroperoxide.

16. An interpolymer prepared in accordance with the process of claim 10.

* * * * *